US009278694B2

(12) United States Patent
Plant et al.

(10) Patent No.: US 9,278,694 B2
(45) Date of Patent: Mar. 8, 2016

(54) DRIVE TRAIN FOR A HYBRID ELECTRIC VEHICLE AND A METHOD OF OPERATING SUCH A DRIVE TRAIN

(75) Inventors: Daniel Plant, London (GB); Gregory Offer, Guildford (GB); Richard William Silversides, London (GB)

(73) Assignee: Imperial Innovations Limited (GB)

( * ) Notice: Subject to any disclaimer, the term of this patent is extended or adjusted under 35 U.S.C. 154(b) by 72 days.

(21) Appl. No.: 14/114,441

(22) PCT Filed: Apr. 25, 2012

(86) PCT No.: PCT/GB2012/000381
§ 371 (c)(1),
(2), (4) Date: May 23, 2014

(87) PCT Pub. No.: WO2012/146891
PCT Pub. Date: Nov. 1, 2012

(65) Prior Publication Data
US 2014/0312619 A1 Oct. 23, 2014

(30) Foreign Application Priority Data

Apr. 28, 2011 (GB) .................................. 1107280.8

(51) Int. Cl.
*B60L 15/20* (2006.01)
*B60W 30/182* (2012.01)
(Continued)

(52) U.S. Cl.
CPC .............. *B60W 30/182* (2013.01); *B60L 11/12* (2013.01); *B60L 11/123* (2013.01); *B60L 11/14* (2013.01); *B60W 10/06* (2013.01); *B60W 10/08* (2013.01);
(Continued)

(58) Field of Classification Search
CPC ......................................................... B60L 11/00
USPC ....................................................... 180/65.21
See application file for complete search history.

(56) References Cited

U.S. PATENT DOCUMENTS 5,318,142 A * 6/1994 Bates et al. .............. 180/65.245
5,778,997 A 7/1998 Setaka et al.
(Continued)

FOREIGN PATENT DOCUMENTS

WO WO 2010023664 A1 * 3/2010 .............. B60L 15/20

OTHER PUBLICATIONS

PCT International Search Report for PCT/GB2012/000381 mailed Aug. 6, 2013 and published Oct. 10, 2013.

*Primary Examiner* — Joseph Waks
(74) *Attorney, Agent, or Firm* — Kaplan Breyer Schwarz & Ottesen, LLP; Harry K. Ahn

(57) ABSTRACT

A method of operating a drive train for a hybrid electric vehicle, and a drive train, is disclosed. The drive train includes an internal combustion engine, a first electrical machine and electrical energy storage. The engine is coupled to drive the first electrical machine as a generator and the first electrical machine connected to supply electrical energy to the electrical energy storage. The electrical energy storage is arranged for supplying electrical energy to at least a second electrical machine for driving wheels of a hybrid electric vehicle. The method includes sensing a parameter indicating the voltage across the electrical energy storage and, in response to this sensed parameter, controlling the internal combustion engine and/or the first electrical machine such that the first electrical machine gives rise to a voltage output of the first electrical machine such that the electrical energy storage is charged without the need for power electronics.

22 Claims, 4 Drawing Sheets

(51) Int. Cl.
*B60L 11/12* (2006.01)
*B60L 11/14* (2006.01)
*B60W 10/06* (2006.01)
*H02J 7/14* (2006.01)
*B60W 20/00* (2006.01)
*B60W 10/08* (2006.01)

(52) U.S. Cl.
CPC ............ B60W 20/108 (2013.01); H02J 7/1415 (2013.01); *B60L 2240/42* (2013.01); *B60L 2240/44* (2013.01); *B60L 2240/622* (2013.01); *B60L 2250/26* (2013.01); *B60W 2510/244* (2013.01); *Y02T 10/6217* (2013.01); *Y02T 10/6286* (2013.01); *Y02T 10/642* (2013.01); *Y02T 10/7022* (2013.01); *Y02T 10/7077* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 7,252,165 B1 * | 8/2007 | Gruenwald et al. | 180/65.25 |
| 7,455,133 B2 * | 11/2008 | Kaneko et al. | 180/65.285 |
| 7,808,214 B2 * | 10/2010 | Bartilson | 320/167 |
| 2002/0069000 A1 | 6/2002 | Nakao | |
| 2002/0123836 A1 | 9/2002 | Komiyama et al. | |
| 2002/0140405 A1 * | 10/2002 | Malik | 320/166 |
| 2004/0060751 A1 * | 4/2004 | Frank | 180/65.2 |
| 2005/0055140 A1 * | 3/2005 | Brigham et al. | 701/22 |
| 2006/0201730 A1 * | 9/2006 | Kaneko et al. | 180/243 |
| 2007/0200529 A1 * | 8/2007 | Kaneko et al. | 318/801 |
| 2015/0203101 A1 * | 7/2015 | Liu et al. | 180/65 |

* cited by examiner

DRIVE TRAIN FOR A HYBRID ELECTRIC VEHICLE AND A METHOD OF OPERATING SUCH A DRIVE TRAIN

CROSS REFERENCE TO RELATED APPLICATIONS

This application is a national phase of PCT application No. PCT/GB2012/000831, filed 25 Apr. 2012, which claims priority to GB patent application No. 1107280.8, filed 28 Apr. 2011, all of which are incorporated herein by reference.

FIELD

This invention relates to a drive train for a hybrid electric vehicle and a method of operating such a drive train. Embodiments relate to a drive train and associated method for use in motor sport applications.

BACKGROUND

Two existing drive train configurations for hybrid electric vehicles are known as a "parallel" configuration and a "series" configuration.

In the parallel configuration, an internal combustion engine is mechanically coupled to drive the wheels and also to drive an electrical machine. The electrical machine is connected, by way of power electronics to electrical energy storage means such as a battery or an arrangement of super-capacitors or ultra-capacitors. The electrical machine can be selectively operated as a generator or a motor. When operated as a generator, the electrical machine is driven by the engine to charge the battery. When operated as a motor to drive the wheels, either together with or instead of the engine, the electrical machine discharges the battery.

In the series configuration, the engine is not mechanically coupled to the wheels which are instead always driven by an electrical machine operating as a motor. An example of an existing series configuration 10 is shown in FIG. 1 of the drawings. As can be seen from FIG. 1, the series drive train 10 includes an internal combustion engine 20 mechanically coupled to drive a first electrical machine 30, which operates as a generator. The output of the first electrical machine 30 is connected via first power electronics 40 to electrical energy storage means 50. The electrical energy storage means 50 are also connected via second power electronics 60 to a second electrical machine 70. The second electrical machine 70 operates as a motor and so is mechanically coupled to wheels 80. Whilst a batteries and/or super or ultra-capacitors may be used as the storage means in this arrangement, the rate at which energy can be put into capacitors and removed therefrom makes these more attractive for use as the storage means in at least some applications.

In operation, the various components are operated under the control of a vehicle control unit (VCU) 90. The engine 20 is operated to drive the generator 30 to charge the storage means 50. However, where the storage means 50 include super or ultra-capacitors, it will be appreciated that the state of charge of these capacitors is proportional to the square of the voltage ($E=\frac{1}{2}CV^2$). The voltage across the capacitors therefore changes considerable with their state of charge. In order to provide for this change in voltage, the first power electronics 40 are provided to control the output voltage of the generator 30 such that it can be used to charge the storage means 50. The first power electronics usually comprise a DC-to-DC converter, which can account for a significant percentage of the cost, and a significant part of the weight, of the drive train components. This is a drawback with the use of super or ultra-capacitors and, to a lesser extent, with electro-chemical storage means such as batteries.

The wheels 80 are driven by the motor 70 operating to discharge the storage means 50. Again, the second power electronics 60 are provided to convert the output of the storage means 50 to the input required to operate the motor 70. As the voltage of the storage means 50 is usually higher than that needed to operate the motor 70, simple voltage reduction is all that is necessary and so the second power electronics are typically less expensive and lighter than the first power electronics.

While hybrid electric vehicles have received much attention as being a possible way of reducing the environmental impact of automotive vehicles on the environment—for example through increased fuel efficiency—such vehicles currently account for a very small proportion of total automotive vehicle sales. One of the main reasons for this is the high cost of current hybrid vehicles in comparison with conventional automotive vehicles.

Hybrid drive trains have also been used in motor sport applications. While the high cost of such drive trains is less of an impediment in motor sport, high weight is seen very much as a drawback.

It is therefore desirable to provide an improved drive train for a hybrid electric vehicle.

SUMMARY

According to a first aspect of this invention, there is provided a method of operating a drive train for a hybrid electric vehicle, the drive train comprising an internal combustion engine, a first electrical machine and electrical energy storage means, the internal combustion engine coupled to drive the first electrical machine as a generator and the first electrical machine connected to supply electrical energy to the electrical energy storage means, the electrical energy storage means arranged for supplying electrical energy to at least a second electrical machine for driving wheels of a hybrid electric vehicle, the method comprising the step of:

sensing a parameter indicative of the voltage across the electrical energy storage means and, in response to this sensed parameter controlling the internal combustion engine and/or the first electrical machine such that the first electrical machine operates to give rise to a voltage output of the first electrical machine such that the electrical energy storage means is charged without the need for power electronics.

The method may comprise the controlling the internal combustion engine in response to the sensed parameter such that the first electrical machine operates at a speed that gives rise to the desired voltage output of the first electrical machine.

The method may comprise controlling the first electrical machine in response to the sensed parameter such that the first electrical machine operates to give rise to the desired voltage output of the first electrical machine. This may be by controlling a field current of the first electrical machine. In such circumstances, the first electrical machine would comprise field windings through which the current is controllable.

In at least certain embodiments, both the internal combustion engine may be controlled to control the speed of the first electrical machine, and the first electrical machine may be controlled, for example by controlling the field current.

The sensed parameter may comprise the speed of the first electrical machine and/or the internal combustion engine; and the voltage of the first electrical machine and/or the electrical energy storage means.

As mentioned above, power electronics are currently used in order to charge electrical energy storage means from the output of the first electrical machine. As the voltage of the storage means varies with its state of charge, the power electronics are needed to convert the voltage output of the first electrical machine to charge the storage means. This is the case both with storage means in the form of super-capacitors, for which voltage varies greatly with state of charge, and even for storage means in the form of batteries, which have a flatter response. As the first power electronics, which may for example be the form of a complicated DC-to-DC converter, can account for a significant proportion of the cost, and a significant part of the weight, of the drive train components, providing an arrangement that removes the need for these components or at least provides for simplification thereof, gives rise to significant cost and weight savings. In consumer applications, cost savings may contribute to the commercial success of a vehicle incorporating a drive train such as that defined above. In motor sport applications, significant weight savings would contribute greatly to vehicle performance. In all applications, removing these power electronics removes a source of potential unreliability and so contributes to the reliability of the vehicle.

Although there is no need for power electronics between the first electrical machine and the electrical energy storage means, in certain embodiments, electrical contact means may be provided to controllably connect the first electrical machine to the electrical energy storage means. The electrical contact means may comprise a controllable contactor and optionally a charging circuit and smaller contactor to equalise the voltages before the main contactor is closed. The method may comprise the step of closing the electrical contact means after start-up of the drive train in preparation for sustained use thereof. The method may include sensing the voltage of the electrical machine and sensing the voltage of the electrical energy storage means and closing the electrical contact means when the two voltages are substantially the same.

The step of controlling the internal combustion engine may comprise controlling the power output of the internal combustion engine. This may be done by varying the amount of fuel and/or air supplied to the engine, such as for, example, by varying a throttle valve in an intake to the engine and/or varying the quantity and/or frequency of fuel injected into the engine, and/or controlling the frequency of spark in the engine.

The step of controlling the internal combustion engine may be preceded by the step of identifying a target voltage of the electrical energy storage means. The step of controlling the internal combustion engine may be preceded by the step of determining the speed of the electrical machine and/or the internal combustion engine that gives rise to a voltage output from the first electrical machine that substantially corresponds to the target voltage of the electrical energy storage means.

The voltage output of the first electrical machine that substantially corresponds to a target voltage of the electrical energy storage means is the voltage output which would cause the electrical energy storage means to charge up to the target voltage. The voltage output of the first electrical machine may substantially equal the target voltage.

The step of sensing a parameter indicative of the voltage across the electrical energy storage means may comprise sensing the voltage of the electrical energy storage means In response to that voltage falling below the target voltage, the step of controlling the internal combustion engine may comprise increasing the power output of the internal combustion engine to a higher level that causes the first electrical machine to rotate with a speed and hence generate with a voltage that charges the electrical energy storage means substantially to the target voltage.

The step of sensing a parameter indicative of the voltage across the electrical energy storage means may comprise sensing the voltage of the electrical energy storage means and in response to that voltage rising above the target voltage, the step of controlling the internal combustion engine may comprise decreasing the power output of the internal combustion engine to a lower level that causes the first electrical machine to rotate with a lower speed and hence lower voltage that discharges the electrical energy storage means substantially to the target voltage.

In either or each case, this may be done by additionally sensing the speed of the first electrical machine and/or the internal combustion engine and, based on this/these and also on the present power output of the internal combustion engine, identifying the higher or lower level of power output as the case may be. The identifying may comprise consulting stored information indicative of the relationship between voltage and speed of the first electrical machine, and the relationship between power and speed of the internal combustion engine, and the relationship between voltage and various conditions of the energy storage means which may include state-of-charge, temperature, history and other parameters. The identifying may comprise executing algorithms indicative of these relationships. The stored information may comprise look-up tables, simplified reduced order models, or complete physics based models.

The field current may be controlled together with the internal combustion engine, and in a corresponding way to that defined above, in order to control the output voltage of the first electrical machine.

There may be a plurality of target voltages, there may be a lower target voltage below which power output of the engine is increased and an upper target voltage above which power output of the engine is decreased.

The or each target voltage may be selectable by a driver. The method may include receiving a mode input indicative of a target voltage selected by a driver. For example, a driver may select a sport-mode that corresponds to a higher target voltage; a driver may select an economy-mode that corresponds to a lower target voltage.

The method may comprise sensing an input provided by a driver and varying the power output of the engine in response to that input. The input may be an input indicative of vehicle speed and/or power output desired by the driver. The input may be indicative of accelerator position. The method may comprise increasing the power output of the engine in response to the input indicating an increase in vehicle speed and/or power output desired by the driver. The method may comprise decreasing the power output of the engine in response to the input indicating a decrease in vehicle speed and/or power output desired by the driver. The method may comprise varying the power output of the engine in response to the input provided by the driver and then varying the power output of the engine in response to the sensed voltage of the electrical energy storage means as defined hereinabove.

The method may comprise receiving a conditions input indicative of road conditions that are or will be encountered by the vehicle and controlling the power output of the engine in response to that input. The method may comprise varying the power output of the engine and/or the or each target voltage of the electrical energy storage means in response to the conditions input. Receiving the conditions input may comprise receiving an input from a vehicle navigation system containing information indicative of road conditions. The method may comprise consulting such a system.

The method may comprise receiving a driver identification input indicative of the driving style of the driver and controlling the power output of the engine and/or the target voltage in response to that input.

According to a second aspect of this invention, there is provided a drive train for a hybrid electric vehicle, the drive train comprising an internal combustion engine, a first electrical machine and electrical energy storage means, the internal combustion engine coupled to drive the first electrical machine and the first electrical machine connected to supply electrical energy to the electrical energy storage means, the electrical energy storage means arranged for supplying electrical energy to at least a second electrical machine for driving wheels of a hybrid electric vehicle, the drive train further comprising control means arranged to carry out the steps of the method defined hereinabove.

The control means may comprise processing means. The processing means may comprise a micro-processor. The control means may comprise a vehicle control unit (VCU) of the vehicle. The control means may comprise or be in communication with storage means containing a record of instructions executable by the control means to cause those means to carry out the steps of the method.

According to a third aspect of this invention, there is provided a computer program comprising code portions executable by processing means to cause those means to carry out the steps of the method defined hereinabove.

According to a fourth aspect of this invention, there is provided a computer program product comprising code portions executable by processing means to cause those means to carry out the steps of the method defined hereinabove According to a fifth aspect of this invention, there is provided a hybrid electric vehicle comprising a drive train as defined in the second aspect.

The internal combustion engine may be coupled to the first electrical machine by mechanical coupling means comprising at least one gearbox. The mechanical coupling means may also comprise a clutch to controllably couple the internal combustion engine to the first electrical machine. It will be appreciated that such a clutch would be functionally analogous to the electrical contactor defined above.

The electrical energy storage means may comprise faradaic, pseudo-faradaic and/or non-faradaic electrical energy storage means. The electrical energy storage means may comprise one or more super-capacitors. The electrical energy storage means may comprise one or more batteries. The electrical energy storage means may comprise one or more hybrid supercapacitors/batteries.

The vehicle may include at least one second electrical machine connected to receive electrical energy from the electrical energy storage means and coupled to drive wheels of the vehicle. There may be a plurality of second electrical machines, each coupled to drive a respective wheel of the vehicle.

In an embodiment, there is provided a method of operating a drive train for a hybrid electric vehicle, the drive train comprising an internal combustion engine, a first electrical machine and electrical energy storage means, the internal combustion engine coupled to drive the first electrical machine as a generator and the first electrical machine connected to supply electrical energy to the electrical energy storage means, the electrical energy storage means arranged for supplying electrical energy to at least a second electrical machine for driving wheels of a hybrid electric vehicle, the method comprising the step of:

controlling the internal combustion engine such that the first electrical machine operates at a speed that gives rise to a voltage output of the first electrical machine such that the electrical energy storage means is charged without the need for power electronics.

Features of this embodiment may comprise features of any aspect defined herein.

BRIEF DESCRIPTION OF THE DRAWINGS

Specific embodiments of the invention are described below by way of example only and with reference to the accompanying drawings, in which.

SPECIFIC DESCRIPTION OF CERTAIN EXAMPLE EMBODIMENTS

Figure 1:
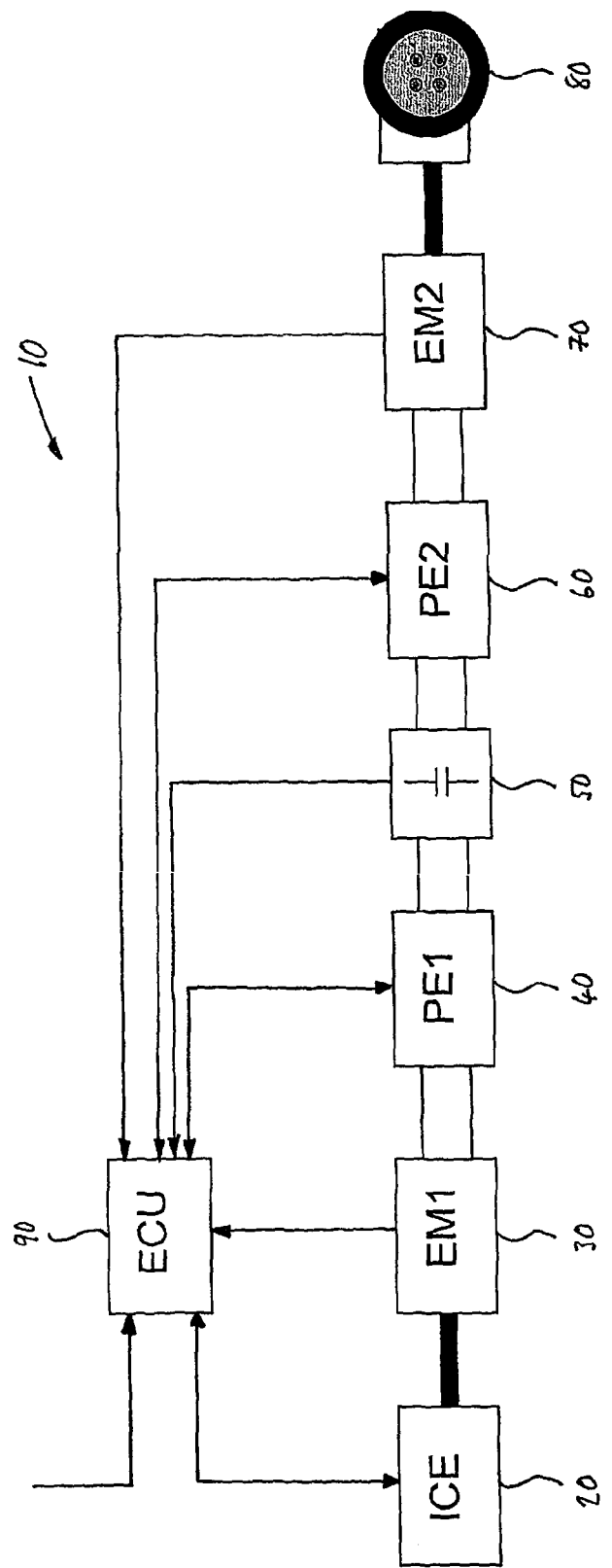
FIG. 1 is a schematic diagram of an existing drive train for a hybrid electric vehicle.
Figure 2:
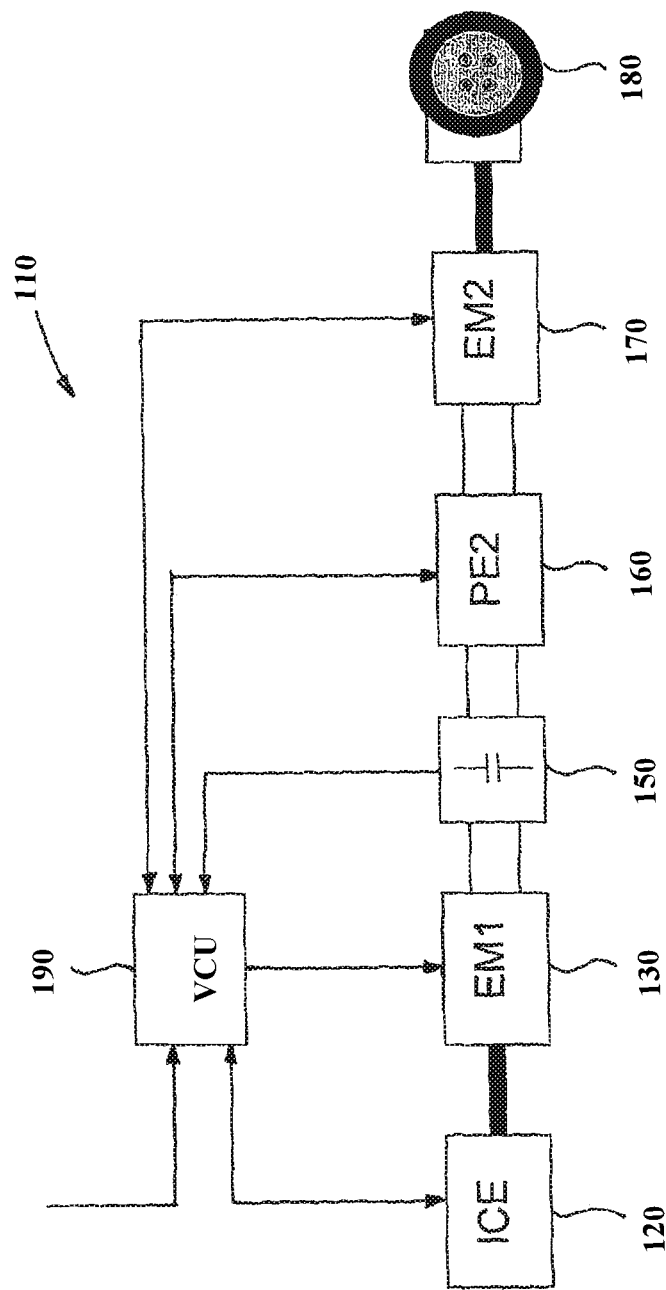
FIG. 2 is a schematic diagram of an improved drive train for a hybrid electric vehicle.

FIG. 2 shows in schematic form a drive train 110 for a hybrid electric vehicle that is an example of an embodiment of the invention. In the present embodiment, it is envisaged that the drive train 110 is for use in a hybrid electric passenger car, such as a four or five-door family car (not shown). However, the principles disclosed herein are equally suited to other applications and may, in particular, be suited to motor sport applications. The drive train 110 has a "series" configuration. The arrangement of the drive train 110 will firstly be described below, followed by its operation.

With continued reference to FIG. 2, the drive train 110 includes an internal combustion engine (ICE) 120 mechanically coupled to drive and, under certain circumstances, be driven by a first electrical machine 130. The first electrical machine 130 is electrically coupled to electrical energy storage means in the form of a bank of super-capacitors 150 which are also electrically connected to an input of power electronics 160. An output of the power electronics 160 is electrically connected to rower second electrical machine 170, which in turn is mechanically coupled to drive wheels 180 of the vehicle. These components are arranged to operate under the control of a vehicle control unit (VCU) 190. Each of the components, and the connection therebetween will now be described in more detail.

It is envisaged that the ICE 120 may take the form of almost any internal combustion engine. In the present embodiment, however, the ICE 120 is a spark-ignition engine with fuel-injection. The first electrical machine 130 may, again, take many forms, but in this embodiment is a permanent magnet brushed DC-machine. The first electrical machine 130 is to be used primarily as a generator to be driven by the ICE 120, but is also to be used as a motor to start the ICE 120. The ICE 120 is coupled to the first electrical machine 130 by a direct mechanical coupling between the crankshaft of the engine and the shaft of the electrical machine 130. In some embodiments a gearbox and/or clutch between the two is used.

The super-capacitors 150 are a bank of Maxwell BCAP3000 super-capacitors connected in series such that the energy difference between the peak and minimum voltage is enough to smooth the transients of the load cycle such that the engine can be operated continuously at high efficiency. The minimum voltage of the super-capacitors is higher than the voltage required for the power electronics 160 electrically connected to power second electrical machine 170 to maintain the top speed of the vehicle. In other embodiments, it is however envisaged that the electrical energy storage means may take other forms. For example, ultra-capacitors and/or one or more batteries may be used.

The power electronics 160 are arranged to carry out the function of voltage reduction from their input side, which is connected to the super-capacitors 150, and their output side, which is connected to the second electrical machine 170. The power electronics 160 are also arranged to act as a motor controller for the second electrical machine 170. In the present embodiment, the power electronics 160 are therefore simple and conventional. In other embodiments in which regenerative braking is provided, the power electronics would additionally operate to charge the super-capacitors 150 from the second electrical machine 170 operating as a generator.

The second electrical machine 170 is also a permanent magnet brushed DC-machine. This electrical machine 170 is to be used primarily as a motor to drive the wheels 180.

In other embodiments, the second electrical machine may also be used as a generator to charge the super-capacitors 150 and so recover energy by regenerative braking. Returning to the present embodiment, the second electrical machine 170 is connected to be powered by the power electronics 160.

As mentioned, the wheels 180 are mechanically coupled to the second electrical machine 170 to be driven thereby. In the present embodiment, the second electrical machine 170 is a single machine that is coupled to drive two drive wheels 180 by way of a differential gear. However, in other embodiments, it is envisaged that other arrangements may be used. For example, there may be more than one of the second electrical machines, such as a respective wheel hub-mounted machine arranged to drive each wheel of the vehicle.

The VCU 190 is structurally similar to a conventional VCU as used in the control of many modern vehicles. As will become clear from the description further below of the operation of the drive train 100, the VCU 190 differs however in the method of operation which it is arranged to carry out.

The VCU 190 is connected to various components of the drive train 110 to provide control signals thereto and to receive inputs therefrom indicative of the operation of the various components. In particular, the VCU 190 is connected to the ICE 120 to receive therefrom inputs indicative of the rotational speed of the ICE 120 and to provide control signals to control the injection of fuel into the ICE 120 (as well as the other inputs and control signals conventional in control of a car engine).

The VCU 190 is also connected to the first electrical machine 130 to sense the speed and voltage of the first electrical machine 130.

The connection between the VCU 190 and the super-capacitors 150 is such that the VCU 190 can sense the voltage thereof. In other embodiments, the VCU 190 also monitors other aspects of the state of the energy storage means 150 and may function as a battery management system.

The VCU 190 is connected to the power electronics 160 to operate that component to reduce the voltage provided to the second electrical machine 170 from the super-capacitors 150 and to exercise motor control over the second electrical machine 170 such that the wheels 180 are driven as desired. In other embodiments, the VCU 190 would also be connected to the power electronics 160 to operate that component to allow charging of the super-capacitors 150 by regenerative braking.

It is envisaged that the VCU 190 additionally has connections to receive the inputs and provide the control signals that are conventional in control of a drive train by a VCU. The VCU 190 has stored in storage means thereof, which in this embodiment takes the form of solid-state storage, instructions that are executable by processing means of the VCU 190, which in this embodiment takes the form of a microprocessor, to cause the VCU 190 to operate in the manner described below.

[General Operation]

An overview of the general method of operation will now be given. This will be followed by a more detailed description of the method of operation during an acceleration event, and then by other aspects of operation.

In operation, the VCU 190 operates to control the power electronics 160 and the second electrical machine 170 in a conventional way to drive the wheels 180 in the desired way by supplying electrical energy from the super-capacitors. (In other embodiments, the VCU 190 may operate to implement torque control algorithms to introduce traction control and torque vectoring during both acceleration and regenerative braking.) The way in which the VCU 190 operates to control the ICE 120 and first electrical machine 130, and how these operate together with the super-capacitors 150, is not, however, conventional. This will now be described.

Figure 3:
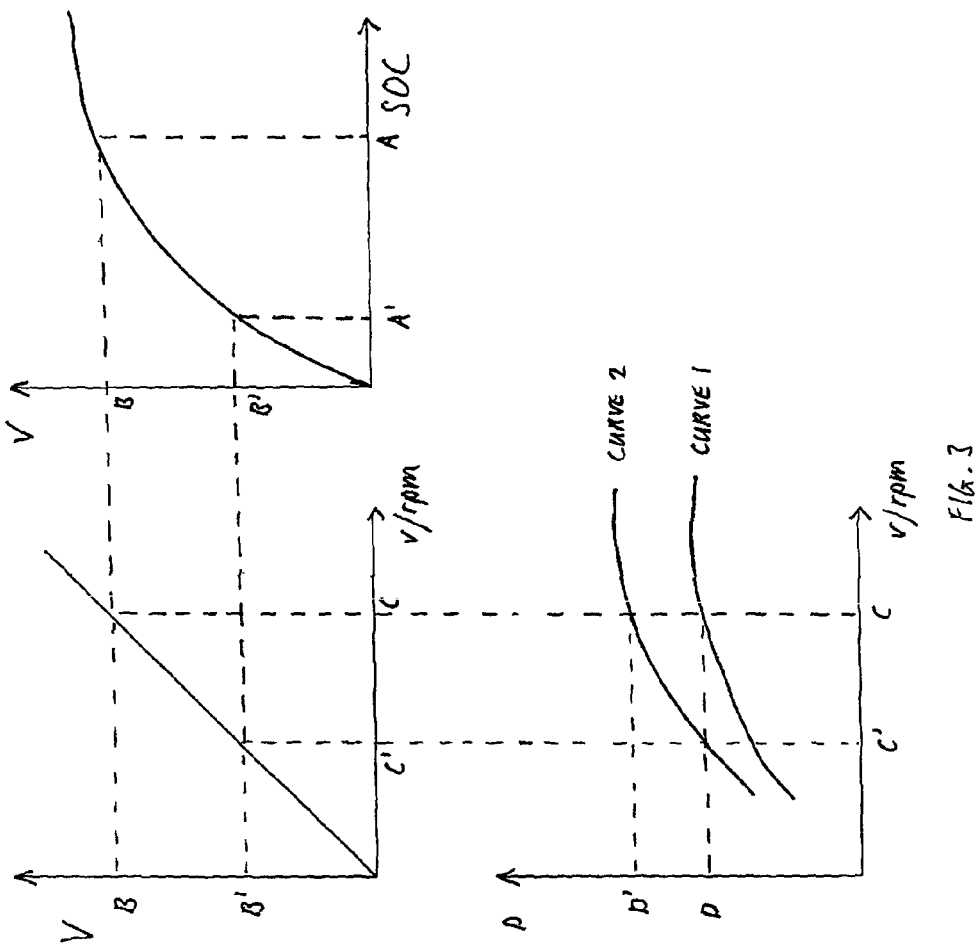
FIG. 3 shows various graphs illustrating operation of the drive train of FIG. 2.

As can be seen from the top, right-hand, graph in FIG. 3, the voltage across the super-capacitors 150 varies greatly with the state of charge of the super-capacitors 150, the relationship being $E=\frac{1}{2}CV^2$. Thus, when the super-capacitors 150 are in a low state of charge, for example during or just after a period of high power demand by the second electrical machine, the voltage across the super-capacitors 150 will be low; and when the super-capacitors 150 are in a high state of charge, for example during or just after a period of low power demand by the second electrical machine 170, the voltage across the super-capacitors 150 will be high.

In order to allow for the super-capacitors 150 to be charged during operation, the VCU 190 controls the drive train 110 such that the first electrical machine 130 is operated with a rotational speed that gives rise to a voltage output that corresponds, or at least substantially corresponds, to a target voltage across the super-capacitors 150. If the output voltage of the first electrical machine is higher than the instantaneous voltage across the super-capacitors, current and hence energy will flow from the first electrical machine 130 to the super-capacitors 150. This charges the super-capacitors 150 and raises the voltage across them. If the first electrical machine is maintained at, or substantially at, the same rotational speed, the super-capacitors will continue to be charged until the target voltage is reached. In variations of the present method in other embodiments, the target voltage may be continually increased such that the rate of charging is maintained at a steady and continuous rate, or it may be varied to control the rate of charging.

The relationship between rotational speed and output voltage of the first electrical machine 130 is shown on the top, left-hand, graph in FIG. 3.

In order to control the first electrical machine 130 in this way, the first electrical machine 130 is operated by controlling the power output of the ICE 120. The power output of the ICE 120 is controlled such that the first electrical machine 130 is operated at the speed that gives rise to a voltage across the output of the first electrical machine 130 that substantially corresponds to the target voltage across the super-capacitors 150.

The relationship between power output and speed of the ICE 120 is shown in the bottom graph in FIG. 3.

In some embodiments it is envisaged that power output of the ICE 120 be controlled by the VCU 190 operating to control an electronically operable throttle valve and by varying this valve such that the ICE 190, and hence the first electrical machine 130, operates at the desired speed. In the present embodiment, however, the power output of the ICE 120 is controlled by controlling the frequency with which fuel is injected into the ICE 120. For example, fuel may be injected every cycle as is conventional or only after a certain number of cycles. By controlling the frequency with which fuel is injected, the power output of the engine is controlled, independently of the engine speed In other embodiments, it is envisaged that the quantity of fuel injected is also, or alternatively, controlled.

In the present embodiment, control of the power output of the ICE 120 by controlling the fuel injection is preferred as this can be done by making use of existing components of the engine. Electrically operated throttle valves are not currently in widespread use and so control of the speed of the ICE 120 by use of such a valve, whilst envisaged, is not used in this embodiment. In other embodiments, throttle control and fuel injection control may both be used.

The VCU 190 therefore senses the voltage across the super-capacitors 150 and also across the first electrical machine 130 and, based on the relationships illustrated in FIG. 3 operates to control the injection of fuel into the ICE 120 that causes the ICE 120 and hence the first electrical machine 130 to rotate at the speed that corresponds to the first electrical machine operating as a generator with an output voltage such that the super-capacitors 150 are maintained at their target voltage.

[Acceleration Event]

The forgoing describes the general principal of operation of this embodiment. Operation during an acceleration event of the vehicle in which a driver demands that more power be sent to the wheels, for example by pressing the accelerator, will now be described.

Firstly, and with reference to FIG. 3, consider that the drive train is operating in steady-state conditions with the super-capacitors 150 charged to a target state of charge A that is, for example, three-quarters of the maximum state of charge. This corresponds to a voltage B, which can be considered the target voltage of the super-capacitors 150. The first electrical machine 130 is generating substantially with a voltage also of B and is being driven at a speed C by the ICE 120 with power output D. (In practice, there may of course be a small voltage drop across the connections from the first electrical machine 130 to the super-capacitors 150.) The arrangement is such that the electrical energy generated substantially equals that needed to power the second electrical machine 170 to drive the wheels 180. Thus the state of charge of the super-capacitors 150 remains steady, the voltage of the super-capacitors 150 remains at the target voltage B and the arrangement is in steady-state.

If the VCU 190 receives an input from the driver, such as via an accelerator pedal, demanding more power to the wheels 180, the VCU 180 operates to control the power electronics 160 to draw more power from the super-capacitors 150 to drive the second electrical machine 170 to accelerate the vehicle. This will reduce the state of charge of the super-capacitors 150 from A to A' and the hence the voltage of the super-capacitors 150 from B to B'. This will in turn mean that there is a voltage difference between the first electrical machine 130 and the super-capacitors 150 resulting in a load being applied to the electrical machine 130 such that more electrical power is supplied to the super-capacitors 150. This slows down the first electrical machine to C', which in turn means that the ICE 120 which is mechanically coupled to the electrical machine 130 also slows down to C'. The power output of the ICE 120 is currently, however, unchanged at D and so the engine can be seen to have moved from low-load power-speed curve CURVE 1 to a higher-load power-speed curve CURVE 2, owing to the higher load placed on the first electrical machine 130 and hence the ICE 120.

The VCU 190 senses that the voltage of the super-capacitors 130 drops from target voltage B to B' and in response to this interrogates look-up tables indicative of the relationships shown in FIG. 3. From these look-up tables, and from sensing the speed of the first electrical machine 130 and/or the engine (the two are mechanically coupled during operation and so the speeds are the same, or proportional if a gearbox between the two is used), and from knowledge of the current power output D, the VCU 190 determines the power D' that corresponds to speed C on the new power-speed curve CURVE 2 that causes the first electrical machine to generate substantially at the target voltage B. Once this power level is determined, the VCU 190 increases the power output of the ICE 120 to this new level. This causes the ICE 120, and hence the first electrical machine to speed up to speed C, which in turn causes the first electrical machine to generate substantially with target voltage B such that the super-capacitors are charged back up to target voltage B.

Therefore, it is possible to control the flow of power from the ICE 120 and electrical machine 130 into the super-capacitors 150, independent of the state of charge of the super-capacitors 150 and independently of the speed of the ICE 120 and electrical machine 130 by controlling the power output of the ICE 120 and avoiding the use of power electronics to control this flow of power. The power output of the ICE 120 can be controlled by controlling the flow of fuel and/or air into the ICE 120.

[Deceleration Event]

Should the driver demand that less power be sent to the wheels 180, for example, by lifting off the accelerator, the VCU 190 is responsive to a signal indicative of this to operate the second power electronics 160 such that less power is drawn from the super-capacitors 150 to power the second electrical machine 170. This reduces the load placed by the super-capacitors 150 on the first electrical machine 130 and hence on the ICE 120, causing operation of the ICE 120 to move back towards the lower-load power-speed curve CURVE1. As the ICE is still being operated with power output D', the ICE 120 speeds up, causing the first electrical machine 130 to speed up and to generate with an increased output voltage, thereby tending to charge the super-capacitors 150 to a voltage above the target voltage B.

The VCU 190 is therefore responsive to a sensed increase in the voltage of the super-capacitors 150, and to the sensed speed of the first electrical machine 130 and ICE 120, to reduce the power output of the ICE 120, based on the look-up tables, such that the first electrical machine generates with a voltage substantially at the target voltage.

It will be appreciated, that a single acceleration event and a single deceleration event, each between only two points of operation, have been described for simplicity. In practice, it is envisaged that control of the drive train moves through many different points on many different power-speed curves during acceleration and deceleration as the VCU 190 continually senses operating conditions and controls the power output of the ICE 190 accordingly in order to avoid the voltage of the super-capacitors 150 deviating much from the target voltage for anything other than a short period of time.

The efficiency of the ICE 120 will vary with speed and power, embodiments will be optimised such that the typical operating region of the system is such that the ICE 120 is operated at optimum efficiency and power for the vehicle.

[Anticipatory Control]

Rather than waiting for voltage and/or speed to change before controlling the power output of the ICE 120, in alternative embodiments the VCU 190 responds to changes in the power requested by the driver to increase the power output of the ICE 120 in anticipation of the voltage across the super-capacitors 150 increasing above or falling below the target voltage. The power output of the ICE 120 may be controlled initially based the power requested by the driver in order to speed up response of the drive-train and to achieve a voltage output of the first electrical machine 130 that approximates to the target voltage. The method described hereinabove based on sensing the voltage across the super-capacitors 150 may then be used to achieve more accurately the target voltage.

In alternative embodiments, more advanced methods of control are envisaged that have forward-thinking functionality and/or will learn from previous experience. For example, for forward thinking, the method running on the VCU 190 may sense all driver inputs and, based on these, increase the power in anticipation of an anticipated acceleration event if the voltage is too low, and then ramp down as the voltage increases if the anticipated acceleration event does not occur. The method carried out by the VCU 190 may also learn what to expect from different drivers, enabling it to optimise efficiency. For example, with driver A who is known to be a gentle driver, the method may avoid ramping up power in anticipation of an acceleration event; but, with driver B, who is know to be a sportier driver, power may be ramped up much more.

The method may also include receiving inputs from a vehicle navigation system of the position of the vehicle on a route being followed by the driver and increase or decrease power output of the ICE 120 in anticipation of changes in the road conditions. For example, power may be increased in anticipation of joining a motorway or approaching an incline. Traffic information may also be an input to the method such that power output of the ICE 120 is, for example, decreased on approaching a queue of traffic.

[Start-Up]

When starting the drive train 110 after a substantial period of rest, the state of charge of the super-capacitors 150 will be at or close to zero. The VCU 190 therefore operates to "de-couple" control of the ICE 120 and hence the first electrical machine 130 from the sensed voltage across the super-capacitors 150 when starting the ICE 120. This is done by disconnecting the first electrical machine 130 from the super-capacitors 150 and controlling the ICE 120 independently of the sensed voltage across the super-capacitors 150. This allows the VCU 190 to start and maintain the ICE 130 and the first electrical machine 130 at a suitable operating point before then connecting the first electrical machine 130 to the super-capacitors 150 to provide the super-capacitors 150 with an initial state of charge sufficient to allow operation of the second electrical machine 170. Once this is done, the VCU controls the drive train 110 in the manner outlined above by coupling operation of the ICE 120 and hence the first electrical machine 130 to the sensed voltage across the super-capacitors 150.

In order to provide for this, the vehicle includes a low voltage system, requiring a small and conventional DC/DC converter to keep the battery charged during operation. During start-up the low voltage battery would be used to start the ICE 120 and then maintain the ICE 120 and first electrical machine 130 at a minimum speed corresponding to the low voltage. It is envisaged that the engine be started using the first electrical machine 130. Alternatively a dedicated starter motor (not shown) may be used. The low voltage battery would also be used to pre-charge the super-capacitors 150, via a charging circuit with a switch and resistor in series, such that the ICE 120 and electrical machine 130 are spinning at a speed corresponding to the low voltage and a power input maintaining that speed without discharging the low voltage battery, the super-capacitors 150 are at a state of charge corresponding to the low voltage, and at this point the VCU 190 closes the main contactor between the electrical machine and super-capacitors. The low voltage battery is then disconnected from both, and the VCU 190 increases the power of the ICE 120 to charge the super-capacitors 150 up to the target voltage. The battery is now recharged continuously from the super-capacitors via the DC/DC converter, and continues to power vehicle ancillaries and VCU 120.

[Alternative Embodiment]

In an alternative embodiment, a modified drive train and method of operation is provided. The modified drive train is generally the same as that 110 described hereinabove, but differs in that the first electrical machine is not a permanent magnet machine and instead has field windings that can be excited to set up the working magnetic field. Furthermore, the current through the field windings is controllable under the control of the VCU. In this embodiment, the current in the field windings is controlled based on look-up tables and other parameters, such as the rotational speed of the first electrical machine, in order to operate the first electrical machine such that it generates at the desired voltage. The schematic diagram of FIG. 2 therefore illustrates the present alternative embodiment as well as it does the first embodiment described hereinabove, but with the differences just described in the first electrical machine of the present alternative embodiment being noted and the control line shown between the VCU and the first electrical machine in FIG. 2 further comprising a signal to control the current in the field winding of the first electrical machine (it being understood that, in the present embodiment, the first electrical machine is provided with a current controller connected to receive electrical power and arranged to provide and to control current in the field windings in response to the control signal from the VCU).

In relation to this alternative embodiment, it is noted that the output voltage of a generator is directly proportional to the rate of change of flux linkage. This means that the output voltage is dependent on the flux in the generator and the speed of rotation. A permanent magnet generator does not allow for any control of the flux, therefore the output voltage is directly proportional to the speed of the generator. Further to this, the torque developed by the generator is directly proportional to the output current and this again depends on the flux in the generator. In the case of drive train 110 described hereinabove, it may be desirable to control the speed of the generator very carefully to be able to run the engine at its most efficient operating point at all times. As there are substantially no power electronics on the output of the generator, the output voltage and hence the output current are not directly controlled. As a consequence of this, the torque required to drive the generator will vary as the operating point of the engine varies. A separately excited generator, as in this alternative embodiment, allows the flux in the generator to be controlled directly by adjusting the field current of the generator. This introduces an extra degree of freedom into the control system for the drivetrain. By adjusting the flux in the generator, it is possible to control the output voltage and current (hence torque) of the generator to some extent, allowing greater flexibility in the control of the drivetrain. This, in turn, would allow the engine to be operated more efficiently throughout a greater proportion of the operating range of the drivetrain. Accordingly, in the present alternative embodiment, it is envisaged both the engine and the field current of the first electrical machine are controlled.

Whist specific components have been described above as making up the embodiments described above, it is envisaged that, even when not explicitly stated above, alternative components may be substituted therefor, where those alternative components are substantially functionally equivalent to those described above.

[Proof of Concept]

In order to prove the concept underlying the embodiments described hereinabove, a bench-top test was set up in the laboratory. In this test, an internal combustion engine was coupled through a gearbox to drive the rotor of an electrical machine. The output of the electrical machine was electrically connected through controllable contactors to a bank of supercapacitors, which were also connected to be controllably loaded by a load bank. A controller was provided to provide control of the other components.

Figure 4A:
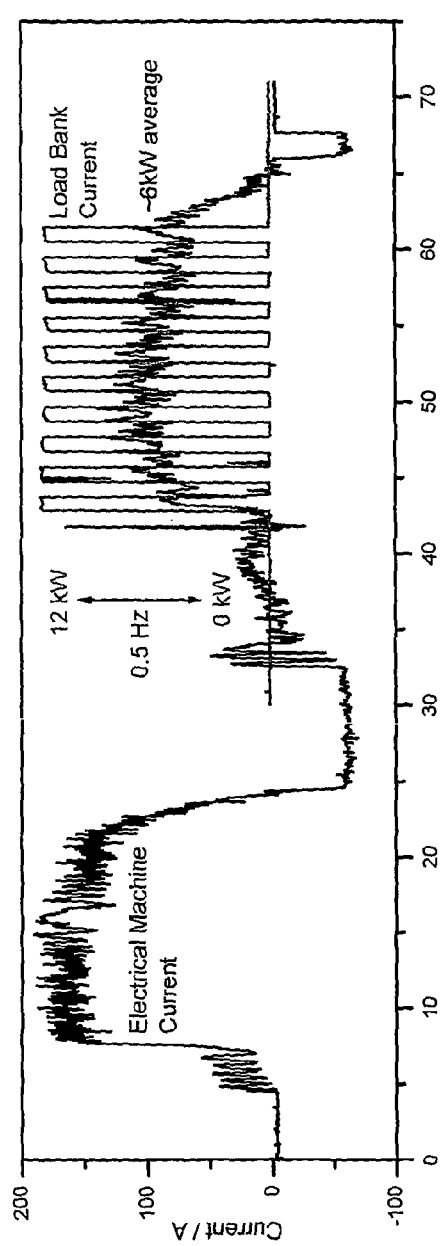
FIGS. 4A and 4B show experimental plots produced in a bench-top test to prove concepts underlying described embodiments.
Figure 4B:
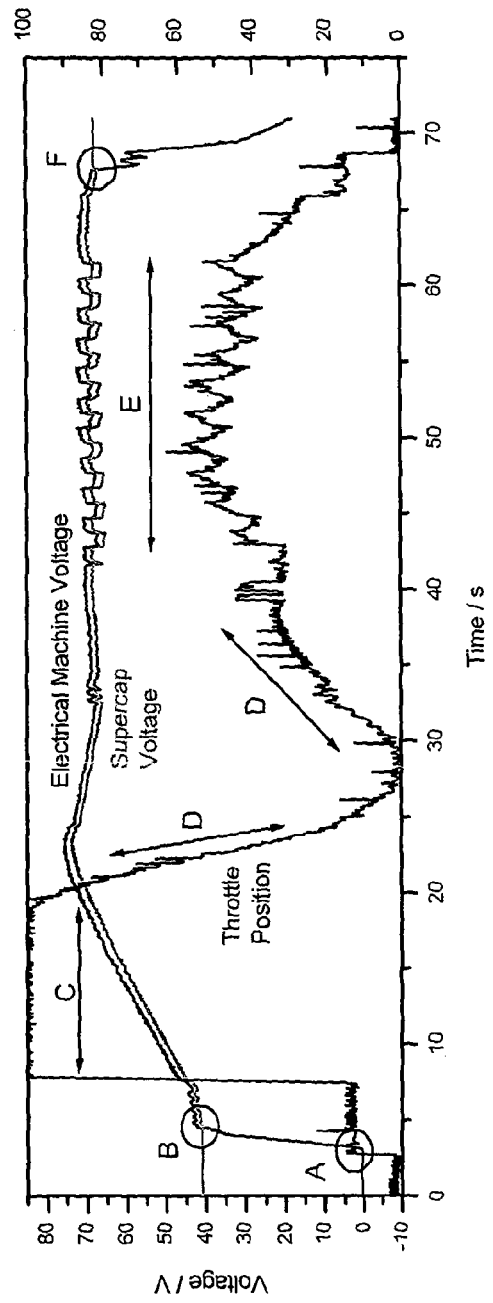

FIGS. 4A and 4B show the results of the test. FIG. 4A shows plots of the output current of the electrical machine and the current of the load bank over the course of the test. FIG. 4B, shows the voltage of the electrical machine and of the supercapacitors over that same time frame, and also shows the throttle position of the engine.

The test results are explained below.
- A. Region A: The supercapacitors have been either precharged or have residual charge from a previous operation. The electrical machine voltage is initially zero until the engine is started with the throttle open around 10%.
- B. Region B: The electrical machine voltage rises, as the engine speeds up, until the voltage matches the supercapacitor voltage within a predefined safety margin (in this example +/− 0.5V). When the controller senses that the voltages match it closes the contactor between the electrical machine and the supercapacitors.
- C. Region C: A target voltage is now set and the controller now attempts to achieve that voltage by controlling the power (in this case the throttle position, but in other embodiments may be spark or ignition control) of the engine to charge the supercapacitors. This can be seen as an increase in current of the electrical machine.
- D. Region D: The controller now actively attempts to maintain a voltage within a minimum and maximum voltage by controlling the power (in this case the throttle position) of the engine to regulate the supercapacitor voltage. This can be seen as initially a decreasing current as the throttle is slowly closed, and then as the throttle is fully closed no power is being produced by the engine, so the engine now starts to slow down which acts as a drag on the electrical machine, the current is therefore negative which discharges the supercapacitors. At a given threshold voltage the controller then opens the throttle and begins charging the supercapacitors again. Note—That at the time of this test, the controller was still being developed; embodiments will be able to regulate a substantially constant voltage.
- E. Region E: The load bank is now used to discharge the supercapacitors, simulating what would happen in the vehicle, i.e. power would be drawn from the system to provide power to the wheels. In this example a square wave of 12 kW magnitude and 0.5 Hz frequency is applied to the system using the load bank. This is representative of what may happen in a vehicle in a motorsport application, where acceleration and deceleration events follow each other very rapidly. The load bank current is shown, and also the electrical machine current. Of interest is that the electrical machine current is more or less smoothed, with minimal noise (some caused by the system and some by the controller), so that the electrical machine is providing an average power of roughly 6 kW which is the average of a 12 kW square wave at 0.5 Hz. This demonstrates very well the principle behind the concept, that the hybrid system smoothes the power demands from the driver and enables the engine to be operated in a constant power mode (i.e. 6 kW) whilst the various capacitances and inertias of the system provide the peak power demands. Observing the voltages it is possible to see instantaneous voltage drops and increases as the power is turned on or off, and then small decreases and increases in the voltages as net power flow from the supercapacitors alternates between −6 kW or +6 kW
- F. Region F: The system is safely shut down by opening the contactor and closing the throttle of the engine, such that the engine and electrical machine slow down under their own internal losses, and the supercapacitor voltage is preserved unless externally discharged.

The invention claimed is:

1. A method of operating a drive train for a hybrid electric vehicle, the drive train comprising an internal combustion engine, a first electrical machine and electrical energy store, the internal combustion engine coupled to drive the first electrical machine as a generator and the first electrical machine connected to supply electrical energy to the electrical energy store, the electrical energy store arranged for supplying electrical energy to at least a second electrical machine for driving wheels of the hybrid electric vehicle, the method comprising the steps of sensing a parameter indicative of the voltage across the electrical energy store and, in response to this sensed parameter, controlling the internal combustion engine such that the first electrical machine operates at a speed that gives rise to a voltage output of the first electrical machine such that the electrical energy store is charged without the need for power electronics.

2. A method according to claim 1, wherein, the step of controlling the internal combustion engine comprises controlling the power output of the internal combustion engine.

3. A method according to claim 1 wherein controlling the first electrical machine comprises controlling a field current of the first electrical machine.

4. A method according to claim 1, wherein the step of controlling the internal combustion engine and/or the first electrical machine is preceded by the step of identifying a target voltage of the electrical energy store.

5. A method according to claim 4, wherein the step of identifying a target voltage is followed by the step of determining the speed of the electrical machine and/or the internal combustion engine that gives rise to a voltage output from the first electrical machine that causes the electrical energy store to be charged to the target voltage.

6. A method according to claim 5, wherein the step of controlling the internal combustion engine comprises the step of determining the power output of the engine that gives rise to the determined speed of the engine and/or electrical machine.

7. A method according to claim 4, wherein the step of sensing a parameter indicative of the voltage across the electrical energy store comprises sensing the voltage of the electrical energy store and in response to that voltage falling below the target voltage, the step of controlling the internal combustion engine comprises increasing the power output of the internal combustion engine to a higher level that causes the first electrical machine to rotate with a speed and hence generate with a voltage that charges the electrical energy store substantially to the target voltage.

8. A method according to claim 7 and additionally comprising controlling the field current of the first electrical machine in a corresponding way to the control of the internal combustion engine such that the first electrical machine generates with a voltage that charges or discharges (as the case may be) the electrical energy store substantially to the target voltage.

9. A method according to claim 7, and further comprising additionally sensing the speed of the first electrical machine and/or the internal combustion engine and, based on this/these and also on the present power output of the internal combustion engine, identifying the higher or lower level of power output as the case may be.

10. A method according to claim 9, wherein the identifying comprises consulting stored information indicative of the relationship between voltage and speed of the first electrical machine, and the relationship between power and speed of the internal combustion engine.

11. A method according to claim 4, wherein the step of sensing a parameter indicative of the voltage across the electrical energy store comprises sensing the voltage of the electrical energy store and in response to that voltage rising above the target voltage, the step of controlling the internal combustion engine comprises decreasing the power output of the internal combustion engine to a lower level that causes the first electrical machine to rotate with a speed and hence generate with a voltage that discharges the electrical energy store substantially to the target voltage.

12. A method according to claim 4, wherein there are a plurality of target voltages, and optionally wherein there is a lower target voltage below which power output of the engine is increased and an upper target voltage above which power output of the engine is decreased.

13. A method according to claim 4, wherein the each target voltage is selectable by a driver.

14. A method according to claim 13, wherein the method includes receiving a mode input indicative of a target voltage selected by a driver, and wherein the mode input is indicative of a sport-mode that corresponds to a higher target voltage; or wherein the mode input is indicative of an economy-mode that corresponds to a lower target voltage.

15. A method according to claim 4, wherein the method comprises receiving a driver input provided by a driver indicative of vehicle speed and/or power output desired by the driver.

16. A method according to claim 15, wherein the method comprises increasing the power output of the engine in response to the driver input indicating an increase in vehicle speed and/or power output desired by the driver; and/or wherein the method comprises decreasing the power output of the engine in response to the driver input indicating a decrease in vehicle speed and/or power output desired by the driver.

17. A method according to claim 16, wherein the method comprises varying the power output of the engine in response to the input provided by the driver and then varying the power output of the engine in response to the sensed voltage of the electrical energy store.

18. A method according to claim 1 and comprising receiving a conditions input indicative of road conditions that are or will be encountered by the vehicle and controlling the power output of the engine in response to that input.

19. A method according to claim 18 and further comprising varying the power output of the engine and/or the or each target voltage of the electrical energy store in response to the conditions input.

20. A method according to claim 18, wherein receiving the conditions input comprising receiving an input from a vehicle navigation system containing information indicative of road conditions.

21. A drive train for a hybrid electric vehicle, the drive train comprising an internal combustion engine, a first electrical machine and electrical energy store, the internal combustion engine coupled to drive the first electrical machine and the first electrical machine connected to supply electrical energy to the electrical energy store, the electrical energy store arranged for supplying electrical energy to at least a second electrical machine for driving wheels of a hybrid electric vehicle, the drive train further comprising a controller arranged to sense a parameter indicative of the voltage across the electrical energy store and, in response to the sensed parameter, control the internal combustion engine such that the first electrical machine operates at a speed that gives rise to a voltage output of the first electrical machine such that the electrical energy store is charged without the need for power electronics.

22. A hybrid electric vehicle comprising a drive train according to claim 21.

* * * * *